United States Patent Office 3,544,689
Patented Dec. 1, 1970

---

3,544,689
METHODS AND COMPOSITIONS FOR TREATING SPASMS EMPLOYING 3',4' - DIMETHOXY - 6 - (2-(p - METHOXYPHENYL) - 1 - ALKYL - ALKYL-ETHYLAMINO) - HEXANOPHENONES AND THE SALTS THEREOF
Hendrik Durk Moed, Van Houtenlaan, Weesp, Netherlands, assignors to U.S. Philip Corporation, New York, N.Y., a corporation of Delaware
No Drawing. Continuation-in-part of application Ser. No. 656,696, July 28, 1967. This application May 12, 1969, Ser. No. 823,961
Int. Cl. A61k 27/00
U.S. Cl. 424—330                           6 Claims

---

ABSTRACT OF THE DISCLOSURE

3',4'-dimethoxy phenones of the formula

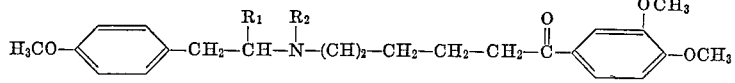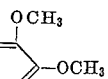

wherein $R_1$ is alkyl of 1 to 2 carbon atoms and $R_2$ is alkyl of 1 to 3 carbon atoms. The compounds have musculotropiospasmolytic activities and are useful in the treatment of disorders of the colon for example spastic colon.

---

This application is a continuation-in-part of my copending application Ser. No. 656,696 filed on July 28, 1967, now U.S. Pat. No. 3,453,328.

The invention in this case relates to novel compositions having spasmolytic activities and to the method of utilizing such compositions.

In general it is desirable that drugs have a very specific action so that after administration they influence only those organs for which the administration is meant. For example, as a broncho-spasmolytic preferably a substance is used, which has little or no influence on the uterine contractions and the intestinal peristalsis.

In addition it is desirable that the drug does not exhibit any side effects, for example, the increase or decrease of the blood pressure, and the like. Further, it is desirable, in many cases, that the action of the drug be of long duration so that the drug need be administered only a few times daily.

According to the invention I have prepared a new and novel group of compounds of the Formula I

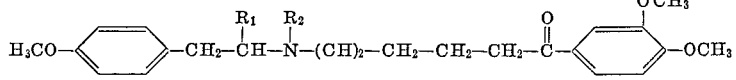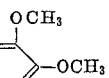

wherein $R_1$ is an alkyl group having 1 or 2 carbon atoms and $R_2$ is an alkyl group having 1 to 3 carbon atoms, and acid addition salts thereof with pharmaceutically acceptable acids. These compounds have a very strong and prolonged musculotropic spasmolytic activity. Further these are particularly valuable compounds in that they have a very specific activity on the smooth musculature of the gastro intestinal tract while exerting little or no influence on the bile production and are devoid of a central activity.

Consequently, these compounds are useful for the treatment of spastic colon, biliary colic and renal colic. The compound of Formula I wherein $R_1$ is a methyl group and $R_2$ is an ethyl group and salts thereof particularly has a very strong and prolonged activity.

As examples of pharmacologically acceptable acids, with which acid addition salts can be formed, may be mentioned: inorganic acids, for example, hydrogen halide such as hydrochloric and hydrobromic acid, sulphuric acid and phosphoric acid, and organic acids, for example, p.toluene sulphonic acid, benzoic acid, acetic acid, propionic acid, tartaric acid, succinic acid, citric acid, fumaric acid, maleic acid, and the like.

The componuds according to the invention may be brought into a form suitable for administration according to methods known per se. For the preparation of pharmaceutical and veterinary compositions, they may be dissolved in or mixed with liquid or solid carriers. The resulting mixtures or solutions may be processed in normal manner to pharmaceutical dosage unit forms, for example, capsules, tablets, carriers, pills and suppositories.

As examples of suitable vehicles which may be used in preparing pharmaceutical and veterinary compositions, may be mentioned: lactose, succrose, sec.- and tert. calciumphosphate, casein, carboxymethylcellulose, potato strach and corn starch, talcum, magnesium stearate, polyglycols, methyl cellulose and ethyl cellulose, and the like. In addition, stabilizers and emulsifying agents may be added.

The method of administration and the dosage employed depends upon the nature and the severity of the infections to be treated. As a rule, the practitioner will have no trouble in choosing the most suitable treatment.

In general, the compounds are administered orally in daily doses of about 0.5 to 5 mg./kg. A daily oral dosage varying between 100 to 200 mg. is preferred for adults and between 25 to 125 mg. for children. Smaller doses are employed in the case of intravenous, intramuscular or rectal administration.

SPASMOLYTIC EFFECT ON GUINEA PIG ILEUM IN VIVO

The test was performed with starved guinea pigs weighing about 500 grams. The animal narcotized with urethane intramuscularly injected in a dose of 1.25 g./kg. of animal using a 25% solution of urethane. In order to prevent asphyxia the trachea was canulated. The Vena Jugularis was prepared free and canulated with a saline filled polythene canula connected to a syringe. A midline incision of the abdominal wall was made. The small intestine was followed from the transition ileum-colon and a ligature was made close behind the third blood vessel stem reaching the intestine from the mesentery. A second ligature was made close behind the sixth vessel stem. In this way an isolated piece of intestine was obtained. The animal was placed in a bath containing Tyrode's solution at 37° C. in such a way that the entire abdomen was placed under the water level. The isolated piece of intestine was cut close behind the ligature and connected to a watermanometer filled with Tyrode's solution. By means of a 10 ml. syringe, connected to the water manometer, the basic pressure was adjusted to that pressure in which no spontaneous contractions occurred. Contractions were recorded on a smoked drum. Contractions were obtained by injecting 5αcarbachol intravenously at 7 minute intervals. After constant response to the spasmogen had been obtained Du 21029=3,4-dimethoxy-6-[2-(p.methoxyphenyl)-1-methyl-dimethylamino] hexanophenone HCl was injected intravenously or duodenally three minutes before the spasmogen. The contractions obtained after injection of the test substance were expressed in percentages of the mean standard carbachol values. The experiment was repeated with papavarine. The following results were obtained:

|  | Dose, mg./kg. | Route | \multicolumn{7}{c}{Time in minutes after administration of Du 21,02} |
|---|---|---|---|---|---|---|---|---|---|
|  |  |  | 3 | 10 | 17 | 24 | 31 | 83 | 4 |
| I | 1 | i.v. | *37 | 65 | 75 | 72 |  |  |  |
|  | 5 | i.d. | 96 | 64 | 50 | 50 | 80 | 73 | 80 |
|  | 10 | i.d. | 96 | 46 | 32 | 56 | 50 | 68 |  |
| II | 10 | i.v. | 57 | 56 | 77 | 77 |  |  |  |
|  | 40 | i.v. | 49 | 34 | 58 | 72 |  |  |  |
|  | 40 | i.d. | 85 | 74 | 64 | 75 | 62 | 76 | 84 |

* Values in percent of mean standard carbachol values
I=Test with Du 21,029.
II=Test with papavarine.

From these results it is concluded that:

Du 21,029 i.v.=10x papavarine i.v.
Du 21,029 i.d.=10–15x papavarine i.d.

The compounds of the invention may be prepared according to methods which are known for the preparation of similar compounds and according to methods analogous thereto.

For example, these compounds may be prepared by reacting an amine of Formula II

with a compound of Formula III: $Y_3$ Hal. In these formulae $Y_2$ represents either a group $R_2$ in which case $Y_1$ is the group

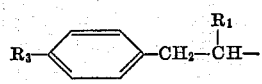

and $Y_3$ is the group

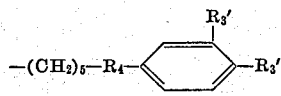

or conversely, or the group

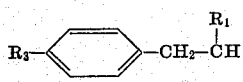

in which case $Y_1$ is the group

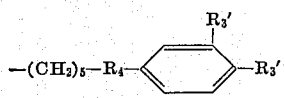

and $Y_3$ is the group $R_2$ or conversely. In these formulae, $R_3$ and $R_3'$ represent a hydroxy group or a methoxy group, while Hal is a halogen atom, a chlorine atom or a bromine atom, but preferably an iodine atom, or, if $Y_3$ is a group $R_2$, also ½ $SO_4$ and $R_4$ is a dialkoxy-methylene group, a keto group or a carbinol group.

This alkylation reaction is preferably carried out in an inert solvent. As such may be mentioned acetonitrile, aliphatic and aromatic hydrocarbons, for example, petroleum ether, benzene and toluene, in addition ketones, for example, acetone, methyl-ethyl ketone, and alcohols, for example, methanol and ethanol.

An acid binder is preferably added to the reaction mixture. As such binders are to be considered tertiary amines, for example triethylamine, pyridine, and quinoline. Inorganic bases also, for example, potassium carbonate, may be used, while alternatively, the reacting amine, added in excess quantity, may be used as an acid binder.

The reaction temperature will usually be between −20° C. and 200° C.

In the coupling product, hydroxy groups may be converted into methoxy groups according to known methods, for example, by means of dimethyl sulphate, methyl halogenide, for example, methyl chloride, or by means of diazomethane. This methylation is carried out in a medium rendered alkaline, for example, with sodium hydroxide or potassium hydroxide. As solvents may be used, for example, aliphatic and aromatic hydrocarbons.

If $R_4$ represents a carbinol group, the latter may be converted into a keto group by oxidation with, for example, sodium bichromate in acid acetone. Instead of bichromate, potassium permanganate may be used. As solvents are to be considered inter alia acetic acid, methylethyl ketone and water.

If $R_4$ is a dialkoxymethylene group, a keto group may also be obtained from said group, by reacting the compound with an acid in an aqueous medium.

The secondary amines used as the starting material in this reaction may be obtained in an analogous manner by alkylation of a primary amine.

That method is to be preferred, in which according to the method described 3', 4'-dimethoxy-6-iodohexanophenone and N-ethyl-2-(4-methoxyphenyl)-1-methylethylamine are used as starting materials.

3'4' - DIMETHOXY - 6 - [2 - (P - METHOXYPHENYL) - 1 - METHYLDIETHLAMINO]HEXANOPHENON HYDROXCHLORIDE (a) 6-chlorohexanoylchloride (I)—42 g. (0.28 mol) of 6-chlorocarbonic acid were dissolved in 50 ml of thionylchloride and the resulting solution was stored at room temperature for 4 days. The solution was then boiled for 30 minutes after which the solvent was evaporated in vacuo. The residue was extracted twice with tetrachloromethane after which the solvent was evaporated. The substance was then distilled in vacuo. Boiling point 104–108° C./ 14 mms.

(b) 6-chloro-3',4'-dimethoxyhenanophenone (II)—32.0 g. (0.240 mol) of aluminum chloride (anhydrous) were dissolved while stirring in 100 ml. of nitrobenzene, the temperature increasing to 40°. The resulting solution was then cooled to 5° C. with an icewater bath, after which 40.5 g. (0.240 mol) of the compound I were added at one time. The solution was rinsed with 20 ml. of nitrobenzene. 35.0 g. (0.254 mol) of veratrol were added dropwise while stirring in 30 minutes, during which the temperature remained below 10° C. The cooling bath was then removed and the reaction mixture was stirred at room temperature for 2 hours. The reaction mixture was then poured into a mixture of 100 ml. of concentrated hydrochloric acid and 200 mg. of ice. The mixture was stirred for 10 minutes after which 300 ml. of ether were added. The "organic layer" was separated and rinsed with 200 ml. of water, respectively. The collected "water layers" were extracted with 100 ml. of ether and the extract was washed twice with 25 ml. of water. The ether was evaporated from the collected organic layers after which the nitrobenzene was removed by means of steam distillation. The residue was then extracted with ether and the extract was then washed with water until all the acid was removed. After drying on sodium sulfate, filtering and evaporating the ether in vacuo, a red oil was obtained. The last traces of water were removed from this oil by adding a little benzene and again evaporating the resulting solution to dryness in vacuo. The residue (62.5 g.) was dissolved in 50 ml. of benzene after which the resulting solution was diluted with 50 ml. of petroleum ether (40–60° C.). This solution was stored overnight at 5° C. The next day the resulting crystalline substance was vacuum filtered, washed with a mixture of 15 ml. of benzene and 35 ml. of petroleum ether and dried in air. 31 g. (48%) of white substance were obtained; melting point 43–46° C.

(c) 3',4'-dimethoxy-6-iodohexanophenone (III)

31.0 g. (0.114 mol) of the compound II were added to a solution of 19.0 g. (0.126 mol) of sodium iodide in 200 ml. of methylethylketone. This reaction mixture was boiled for 7 hours and allowed to remain overnight at room temperature. The next day the formed sodium chloride was vacuum filtered and the filtrate evaporated to dryness in vacuo. Water, ether, and a spoonful of sodium thiosulphate were added to the residue. The layers were separated and a small amount of benzene was added to the "ether layer." The solution was dried on sodium sulfate. After filtering and evaporating to dryness of the filtrate in vacuo, 42 g. of a pale orange oil were obtained which were dissolved in 45 ml. of benzene and diluted with 105 ml. of petroleum ether. After this solution was allowed to stand overnight at 5° C., 35.4 g. (86%) of a white substance was separated by vacuum-filtration, melting point 55–57° C.

(d) A mixture of 35.4 g. (97.7 mmol) of the compound III and 37.8 g., (195.5 mmol) of N - ethyl - 2-(4 - methoxyphenyl) - 1 - methylethylamine were boiled and 200 ml. of methylethylketone were heated to boiling for 20 hours. The reaction mixture was then evaporated to dryness in vacuo; 150 ml. of water and 150 ml. of ether were added to the residue. This gave rise to the formation of three layers; a water layer, an ether layer and an oil layer.

By crystallization from acetone ether and recrystallization with methyl ethyl ketone/ethyl acetate 4.7 g. of a white substance with a melting point of 122–125° C. were obtained from the oil layer. The ionic iodine content was 22.8%. This readily corresponds to the iodine content of the hydroiodide, for which 22.9% is calculated. The 4.7 g. of substance would then mean an "additional

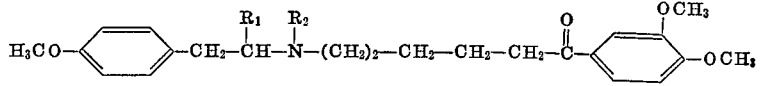

yield" of 9%. The water layer was extracted once more with 75 ml. of ether and this ether extract was added to the ether layer already obtained. The resulting ethereal solution was dried on magnesium sulphate. After filtration and evaporation to dryness in vacuo, 36 g. of oil were obtained. This oil was dissolved in 100 ml. of acetic anhydride, stored at room temperature for 30 minutes and then evaporated to dryness in vacuo. The residue was dissolved in 100 ml. of ether. The resulting solution was extracted with 60 ml. of 2 N hydrochloric acid in which three layers were formed: ether layer, water layer and oil layer. The water layer and the oil layer were together rendered alkaline with 30 ml. of a 50% potassium hydroxide solution after which ether extractions were carried out twice with 30 ml. of ether. These extracts, after having been dried together on sodium sulphate, were evaporated to dryness in vacuo. The residue was dissolved in 30 ml. of 2.7 N alcoholic hydrochloric acid after which 150 ml. of benzene were added. This solution was evaporated to dryness in vacuo and the residue was taken up in 75 ml. of benzene and again exaporated to dryness in vacuo. In this manner 40.5 g. of a thick oil were obtained. This oil was dissolved in 300 ml. of ethyl acetate and stored overnight at 5° C. The resultant crystallized substance was vacuum filtered and dried in air. This substance was then recrystallized from 400 ml. of ethyl acetate; melting point 106–109° C.

Examples of compositions suitable for administration are:

Suppository

| | Mg. |
|---|---|
| Du 21,029 | 100 |
| Of suppository mass | 1400 |

Tablet

| | |
|---|---|
| Du 21,029 | 25 |
| Lactose | 335 |
| Potato starch | 60 |
| Talc | 25 |
| Magnesium stearate | 5 |
| Gelatin | 5 |

Injection liquid 25 mg. Du 21,029
15 mg. benzyl alcohol
1 ml. pyrogen-free distilled water

What I claim is:

1. A composition having musculotropic spasmolytic activities said composition comprising a compound selected from the group consisting of a base of the formula wherein $R_1$ is alkyl having 1 to 2 carbon atoms inclusive and $R_2$ is alkyl of 1 to 3 carbon atoms inclusive and an acid addition salt thereof with a pharmaceutically acceptable acid in an effective amount and a major amount of a pharmaceutical carrier therefor.

2. The composition of claim 1 wherein the compound is 3', 4'-dimethoxy-6-[2-(p.methoxyphenyl)-1-methyldiethylamino]-hexanophenone hydrochloride.

3. A method of treating spasms of the colon in mammals comprising administering to said mammal an effective amount of a composition of claim 1.

4. The method of claim 3 wherein the composition is orally administered.

5. A method of treating spasms of the colon in mammals comprising administering to said mammal an effective amount of a composition of claim 2.

6. The method of claim 5 wherein the composition of claim 2 is orally administered.

References Cited

UNITED STATES PATENTS 3,341,593   9/1967   Ziele _____ 260—570.6

STANLEY J. FRIEDMAN, Primary Examiner